United States Patent
Kim et al.

(10) Patent No.: US 11,378,665 B2
(45) Date of Patent: Jul. 5, 2022

(54) DISTANCE MEASURING APPARATUS AND METHOD OF OPERATING THE SAME

(71) Applicant: KOREA RESEARCH INSTITUTE OF STANDARDS AND SCIENCE, Daejeon (KR)

(72) Inventors: Jae-Wan Kim, Daejeon (KR); Jae-Yong Lee, Chungcheongbuk-do (KR); Jong-Ahn Kim, Daejeon (KR); Jae-Heun Woo, Daejeon (KR); Young Pyo Hong, Chungcheongbuk-do (KR)

(73) Assignee: Korea Research Institute of Standards and Science, Daejeon (KR)

( * ) Notice: Subject to any disclaimer, the term of this patent is extended or adjusted under 35 U.S.C. 154(b) by 807 days.

(21) Appl. No.: 16/321,210

(22) PCT Filed: Aug. 9, 2017

(86) PCT No.: PCT/KR2017/008593
§ 371 (c)(1),
(2) Date: Jan. 28, 2019

(87) PCT Pub. No.: WO2018/043941
PCT Pub. Date: Mar. 8, 2018

(65) Prior Publication Data
US 2019/0162852 A1    May 30, 2019

(30) Foreign Application Priority Data

Sep. 5, 2016 (KR) .......................... 10-2016-0114037

(51) Int. Cl.
*G01S 7/4865*    (2020.01)
*G06T 7/70*    (2017.01)
(Continued)

(52) U.S. Cl.
CPC ............ *G01S 7/4865* (2013.01); *G01C 11/06* (2013.01); *G01S 17/10* (2013.01); *G01S 17/89* (2013.01);
(Continued)

(58) Field of Classification Search
CPC ......... G01C 11/06; G01S 17/10; G01S 17/89; G01S 17/894; G01S 7/4865; G01S 17/08;
(Continued)

(56) References Cited

U.S. PATENT DOCUMENTS 6,396,570 B2    5/2002    Takayanagi et al.
7,230,685 B2    6/2007    Suzuki et al.
(Continued)

FOREIGN PATENT DOCUMENTS

JP    2001264439 A    9/2001
JP    2005-214743 A    8/2005
(Continued)

OTHER PUBLICATIONS

Cho, Kyoung Lae et al.;"Depth Sensor 3D Image Sensor and Depth Sensing Method There-of"; Bibliographic Data of KR20100128797 (A); Dec. 8, 2010; http://worldwide.espacenet.com.
(Continued)

*Primary Examiner* — Yuqing Xiao
*Assistant Examiner* — Amir J Askarian
(74) *Attorney, Agent, or Firm* — Andrew D. Fortney; Central California IP Group, P.C.

(57)    ABSTRACT

A distance measuring apparatus includes an image sensor and an image sensor driver. The image sensor includes a photodiode, a first capacitor and a second capacitor, and a first transfer gate and a second transfer gate configured to transmit an output of the photodiode to the respective first
(Continued)

and second capacitors. The image sensor driver is configured to complementarily drive the first transfer gate and the second transfer gate.

18 Claims, 8 Drawing Sheets

(51) Int. Cl.
| | |
|---|---|
| *G01C 11/06* | (2006.01) |
| *G06T 7/55* | (2017.01) |
| *H04N 5/232* | (2006.01) |
| *G01S 17/10* | (2020.01) |
| *G01S 17/89* | (2020.01) |

(52) U.S. Cl.
CPC .............. *G06T 7/55* (2017.01); *G06T 7/70* (2017.01); *H04N 5/232* (2013.01)

(58) Field of Classification Search
CPC . G06T 7/55; G06T 7/70; H04N 5/232; H04N 5/23212; H04N 5/235; H04N 5/378; H04N 3/14; H04N 5/30; H04N 5/335; H04N 5/353; H04N 5/357; G01B 11/24; G01J 1/44; G03B 3/00; H01L 27/148
See application file for complete search history.

(56) References Cited

U.S. PATENT DOCUMENTS

| | | | |
|---|---|---|---|
| 7,436,495 B2 | 10/2008 | Tachino et al. | |
| 8,508,720 B2 | 8/2013 | Kamiyama | |
| 2001/0024271 A1 | 9/2001 | Takayanagi et al. | |
| 2005/0162638 A1 | 7/2005 | Suzuki et al. | |
| 2007/0146682 A1 | 7/2007 | Tachino et al. | |
| 2007/0188640 A1* | 8/2007 | Xu | H04N 5/365 348/308 |
| 2008/0079833 A1* | 4/2008 | Ichikawa | G01S 17/894 348/311 |
| 2009/0079857 A1* | 3/2009 | Kato | H04N 5/3742 348/294 |
| 2010/0303299 A1 | 12/2010 | Cho et al. | |
| 2011/0194099 A1 | 8/2011 | Kamiyama | |
| 2014/0184746 A1* | 7/2014 | Kang | H04N 13/204 348/46 |

FOREIGN PATENT DOCUMENTS

| | | |
|---|---|---|
| JP | 2007-170856 A | 7/2007 |
| KR | 10-2010-0128797 A | 12/2010 |

OTHER PUBLICATIONS

Tateno Yoshihide et al.;"Distance Data Generating Method, Distance Image Generating Apparatus and Photoelectronic Sensor"; Bibliographic Data of JP2007170856 (A); Jul. 5, 2007; http://worldwide.espacenet.com.

Suzuki Yosuke et al.;"Distance Data Generation Device, Generation Method and Program"; Bibliographic Data of JP2005214743 (A); Aug. 11, 2005 http://worldwide.espacenet.com.

Takayanagi Isao et al.;"Device and Method for Measuring Distance"; Bibliographic Data of JP2001264439 (A); Sep. 26, 2001 http://worldwide.espacenet.com.

International Search Report; dated Nov. 8, 2017; International Application No. PCT/KR2017/008593; 4 pages; Korean Intellectual Property Office, Daejeon, Republic of Korea.

* cited by examiner

DISTANCE MEASURING APPARATUS AND METHOD OF OPERATING THE SAME

CROSS-REFERENCE TO RELATED APPLICATIONS

This application is a continuation of and claims priority to PCT/KR2017/008593 filed on Aug. 9, 2017, which claims priority to Korea Patent Application No. 10-2016-0114037 filed on Sep. 5, 2016, the entireties of which are both hereby incorporated by reference.

TECHNICAL FIELD

The present disclosure relates to semiconductor devices and, more particularly, to a distance measuring apparatus and a method of operating the same.

BACKGROUND

Various types of distance measuring apparatus have been used to measure a distance from a target object. For example, some of the distance measuring apparatuses may capture a target object with multiple pixels and measure a distance depending on an angular difference of the target object viewed from multiple pixels. Other distance measuring apparatus may irradiate a light to a target object and measure a distance to the target object using a time of flight (ToF) that the light is reflected and returns from the target object.

One of the important elements for a distance measuring apparatus is reliability. A high-reliability distance measuring apparatus may measure a distance with a relatively small error. On the other hand, a low-reliability distance measuring apparatus measures the distance with a relatively great error. To be useful in real life or industry, there is an increasing demand for research and development of a distance measuring apparatus having improved reliability.

SUMMARY

Example embodiments of the present disclosure provide a distance measuring apparatus having improved reliability and a method of operating the same.

A distance measuring apparatus according to an example embodiment of the present disclosure includes an image sensor and an image sensor driver. The image sensor includes a photodiode, a first capacitor and a second capacitor, and a first transfer gate and a second transfer gate configured to transmit an output of the photodiode to the respective first and second capacitors. The image sensor driver is configured to complementarily drive the first transfer gate and the second transfer gate.

A method of operating a distance measuring apparatus according to an example embodiment of the present disclosure includes charging the first and second capacitors connected to a photodiode through first and second transfer gates, respectively, irradiating a light to a target object, decreasing a voltage of the first capacitor in proportion to the intensity of a light incident on the photodiode and in proportion to a time elapsed after the light is irradiated, decreasing a voltage of the second capacitor in proportion to the intensity of the light incident on the photodiode and in inverse proportion to the time elapsed after the light is irradiated, and measuring a distance between the target object and the distance measuring apparatus using the voltage of the first capacitor and the voltage of the second capacitor.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

DETAILED DESCRIPTION

Figure 1:
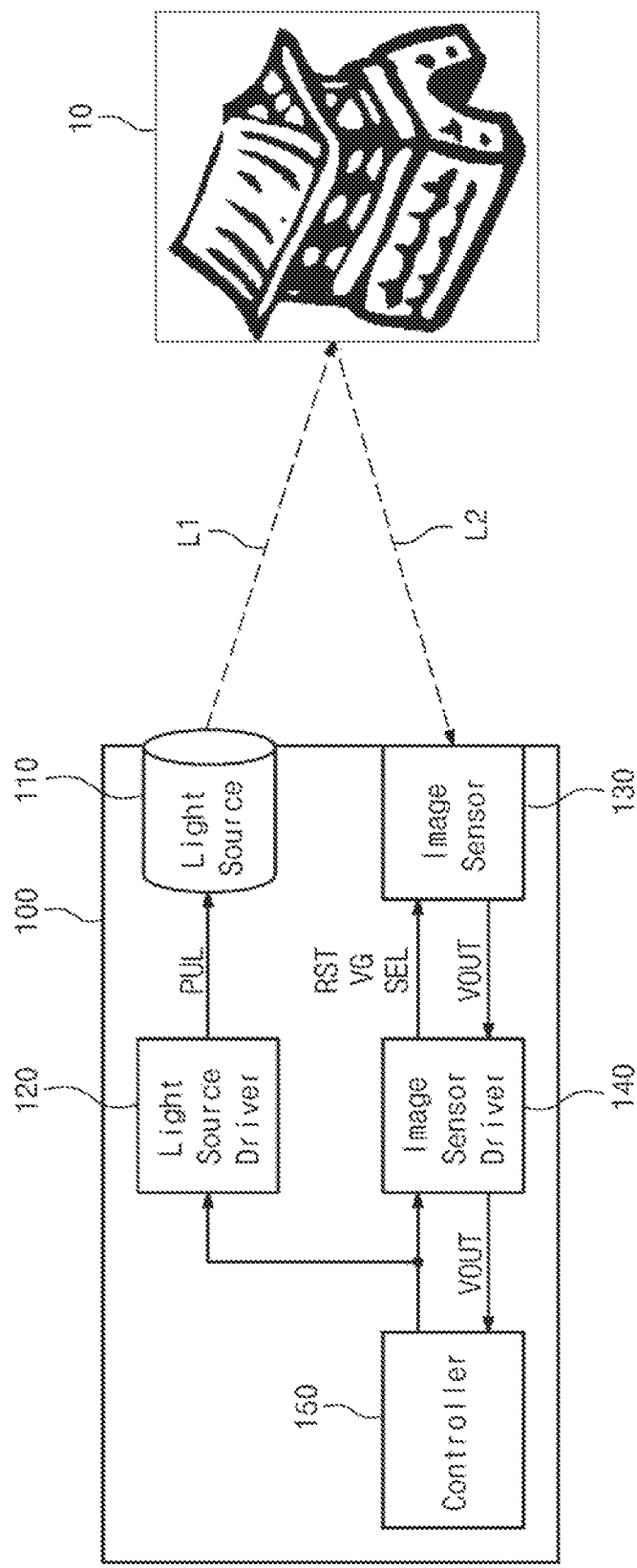
FIG. 1 is a block diagram of a distance measuring apparatus according to an example embodiment of the present disclosure.

Example embodiments of the present disclosure will now be described below more fully with reference to accompanying drawings. The present disclosure may, however, be embodied in different forms and should not be constructed as limited to the embodiments set forth herein. Rather, these embodiments are provided so that this disclosure will be thorough and complete, and will fully convey the scope of the present invention to those skilled in the art.

Reference numerals are indicated in detail in example embodiments of the present disclosure, and their examples are represented in reference drawings. In every possible case, like reference numerals are used for referring to the same or similar elements in the description and drawings.

FIG. 1 is a block diagram of a distance measuring apparatus 100 according to an example embodiment of the present disclosure. Referring to FIG. 1, the distance measuring apparatus 100 includes a light source 110, a light source driver 120, an image sensor 130, an image sensor driver 140, and a controller 150.

The light source 110 may irradiate a first light L1 under the control of the light source driver 120. For example, the light source 110 may irradiate a pulse-shaped first light L1 to a target object 10 in response to a pulse signal PUL received from the light source driver 120. For example, the light source 110 may be a pulsed laser light source.

The light source driver 120 may control the light source 110 under the control of the controller 150. For example, the light source driver 120 receives a command, notifying a start of distance measurement, from the controller 150 and outputs the pulse signal PUL to the light source 110 when a predetermined time has elapsed since the command was received. As another example, the light source driver 120 may receive a command, requesting the controller 150 to output the pulse signal PUL, and may output the pulse signal PUL to the light source 110 according to the received command.

The image sensor 130 may operate under the control of the image sensor driver 140. For example, the image sensor 130 may be reset in response to reset signals RST received from the image sensor driver 140. Resetting the image sensor 130 may mean that previously collected information is discarded in the image sensor 130 and a preparation is performed to collect new information. The image sensor 130 may generate information on externally received light in response to a gate voltage VG received from the image sensor driver 140. For example, the image sensor 130 may generate information on the intensity of a second light L2 reflected from the target object 10 or information on the second light L2 and an ambient light. The image sensor 130 may output the collected information to the image sensor driver 140 in response to selected signals SEL received from the image sensor driver 140. For example, the collected information may be transmitted to output voltages VOUT.

The image sensor driver 140 may control the image sensor 130 under the control of the controller 150. For example, the image sensor driver 140 may receive a command, notifying a start of distance measurement, from the controller 150 and may output reset signals RST, gate voltages VG, and selected signals SEL to the image sensor 130 when predetermined times have elapsed since the command was received. As another example, the image sensor driver 140 may receive commands, requesting the controller 150 to output reset signals RST, gate voltages VG, and selected signals SEL, from the controller 150 and may output the reset signals RST, the gate voltages VG, and the selected signals SEL to the image sensor 130 according to the received commands. The image sensor driver 140 may deliver the output voltages VOUT, received from the image sensor 130, to the controller 150.

The controller 150 may control the light source driver 120 and the image sensor driver 140 to perform the distance measurement. The controller 150 may receive the output voltages VOUT from the image sensor driver 140 and calculate a distance between the distance measuring apparatus 100 and the target object 10 from the output voltages VOUT. The controller 150 may display the calculated distance on a display unit such as a liquid crystal display (LCD) or may deliver the calculated distance to another device through a wired or wireless interface.

In FIG. 1, the image sensor driver 140 has been described as delivering the output voltages VOUT to the controller 150. However, the image sensor driver 140 may be applied to calculate distances from the output voltages VOUT and to deliver the calculated distances to the controller 150.

Figure 2:
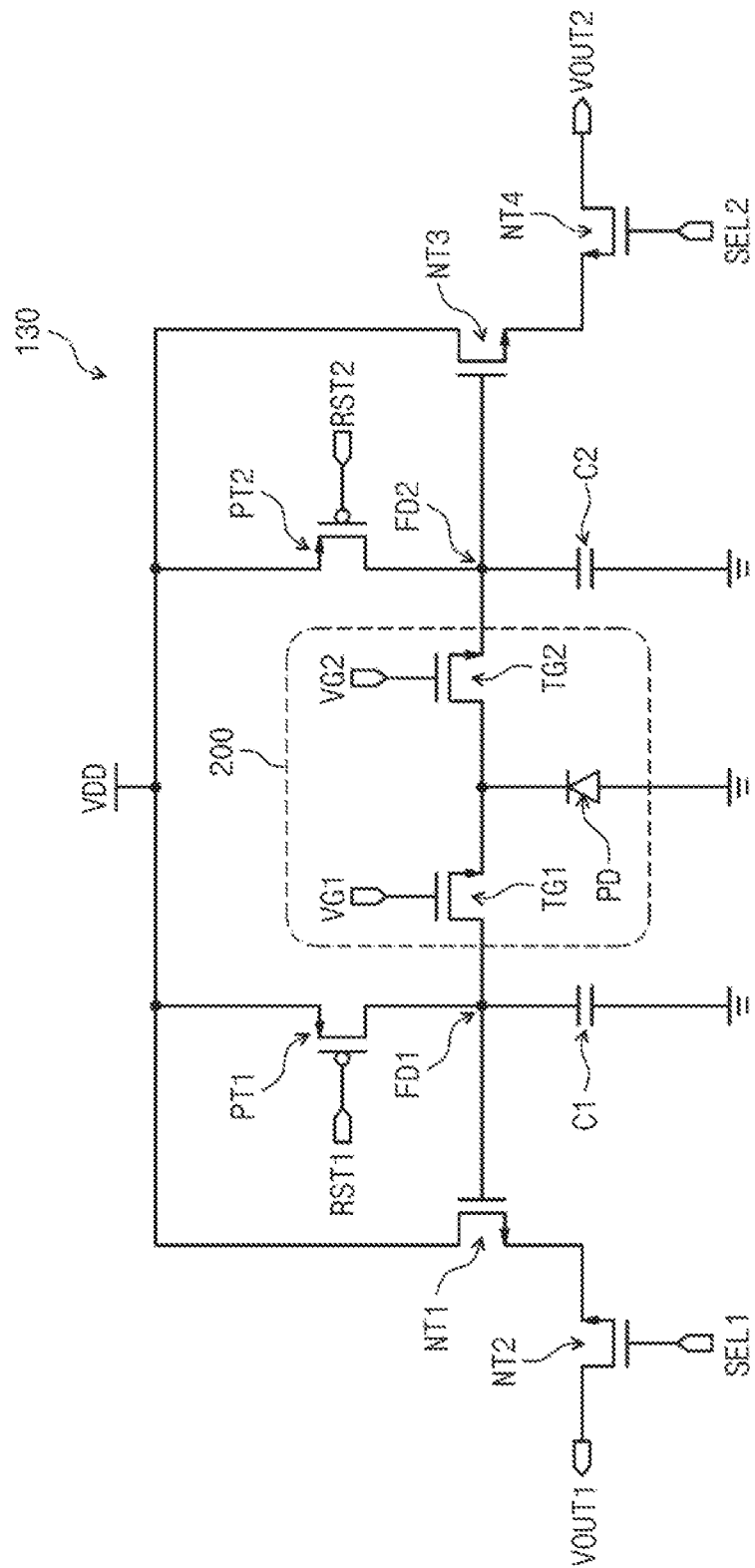
FIG. 2 is a circuit diagram illustrating an example of an image sensor in FIG. 1.

FIG. 2 is a circuit diagram illustrating an example of the image sensor 130 in FIG. 1. As an example, an example of a single pixel of the image sensor 130 is illustrated in FIG. 2. The image sensor 130 may include a plurality of pixels as well. In this case, each of the plurality of pixels may have the same structure as shown in FIG. 2. The image sensor 130 may be extended even further to include a conventional RGB pixel.

Referring to FIGS. 1 and 2, the image sensor 130 includes first and second P-type transistors PT1 and PT2, first to fourth N-type transistors NT1 to NT4, first and second capacitors C1 and C2, first and second transfer gates TG1 and TG2, and a photodiode PD.

A cathode of the photodiode PD is commonly connected to first nodes (for example, sources) of the first and second transfer gates TG1 and TG2. An anode of the photodiode PD is connected to a ground terminal. First and second gate voltages VG1 and VG2 are supplied to gates of the first and second transfer gates TG1 and TG2, respectively. The first and second gate voltages VG1 and VG2 may be supplied from the image sensor driver 140. Second nodes (for example, drains) of the first and second transfer gates TG1 and TG2 are connected to the first and second detection nodes FD1 and FD2, respectively.

The first capacitor C1 is connected between the first detection node FD1 and the ground terminal. The first detection node FD1 may be connected to the second node (e.g., a drain) of the first P-type transistor PT1 and may be connected to the gate of the first N-type transistor NT1. The second capacitor C2 is connected between the second detection node FD2 and the ground terminal. The second detection node FD2 may be connected to the second node (for example, a drain) of the second P-type transistor PT2 and may be connected to a gate of the third N-type transistor NT3.

A first node (for example, a source) of the first P-type transistor PT1 is connected to a power supply node to which the power source voltage VDD is supplied. A second node (for example, a drain) of the first P-type transistor PT1 is connected to the first detection node FD1. The first reset signal RST1 is supplied to the gate of the first P-type transistor PT1. The first reset signal RST1 may be supplied from the image sensor driver 140. A first node (for example, a source) of the second P-type transistor PT2 is connected to the power supply node to which the power supply voltage VDD is supplied. A second node (for example, a drain) of the second P-type transistor PT2 is connected to the second detection node FD2. The second reset signal RST2 is supplied to the gate of the second P-type transistor PT2. The second reset signal RST2 may be supplied from the image sensor driver 140.

A first node (for example, a source) of the first N-type transistor NT1 is connected to a first node (for example, a source) of the second N-type transistor NT2. A second node (for example, a drain) of the first N-type transistor NT1 is connected to the power supply terminal. The gate of the first N-type transistor NT1 is connected to the first detection node FD1. A first node (for example, a source) of the second N-type transistor NT2 is connected to the first node (for example, a source) of the first N-type transistor NT1. A second node (for example, a drain) of the second n-type transistor NT2 may be a first output terminal at which a first output voltage VOUT1 is output. A first selection signal SEL1 is supplied to a gate of the second N-type transistor NT2. The first selection signal SEL1 may be supplied from the image sensor driver 140.

A first node (for example, a source) of the third N-type transistor NT3 is connected to a first node (for example, a source) of the fourth N-type transistor NT4. A second node (for example, a drain) of the third N-type transistor NT3 is connected to the power supply terminal. A gate of the third N-type transistor NT3 is connected to the second detection node FD2. A first node (for example, a source) of the fourth N-type transistor NT4 is coupled to a first node (for example, a source) of the third N-type transistor NT3. A second node (for example, a drain) of the fourth N-type transistor NT4 may be a second output terminal at which a second output voltage VOUT2 is output. A second selection signal SEL2 is supplied to a gate of the fourth N-type transistor NT4. The second selection signal SEL2 may be supplied from the image sensor driver 140.

As an example, the first and second P-type transistors PT1 and PT2 may be p-type metal oxide semiconductor field effect transistors (PMOSFETs). The first to fourth N-type transistors NT1 to NT4 may be N-type metal oxide semiconductor field effect transistors (NMOSFETs). The first and second transfer gates TG1 and TG2 may be NMOSFETs. However, a pixel of the image sensor 130 according to the present inventive concept is not limited to the structure illustrated in FIG. 2. For example, the P-type transistors and the N-type transistors are interchangeable, and a power supply terminal and a ground terminal are interchangeable.

Figure 3:
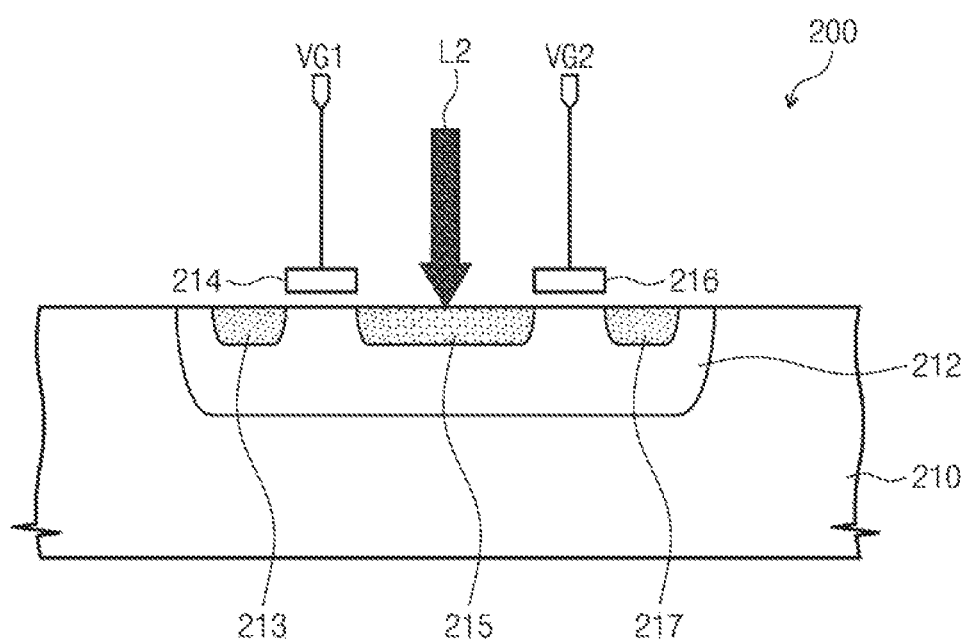
FIG. 3 illustrates an example of a vertical cross-sectional view of first and second transfer gates and a photodiode in FIG. 2.

FIG. 3 illustrates an example of a vertical cross-sectional view of the first and second transfer gates TG1 and TG2 and the photodiode PD in FIG. 2. Referring to FIGS. 2 and 3, a P-type well 212 is formed in a P-type substrate 210. For example, the P-type well 212 may be formed directly on a P-type substrate 210 or in a pocket p-well (not shown) formed in an N-type well. A doping concentration of the P-type well 212 may be higher than a doping concentration of the P-type substrate 210.

First to third N-type regions 213, 215, and 217 are formed in the P-type well 212. A first gate 214 is disposed on the P-type well 212 in a space between the first and second N-type regions 213 and 215. A second gate 216 is disposed on the P-type well 212 in the space between the second and third N-type regions 215 and 217. The first N-type region 213, the second N-type region 215, and the first gate 214 may constitute a first transfer gate TG1. The second N-type region 215, the third N-type region 217, and the second gate 216 may constitute a second transfer gate TG2. The second N-type region 215 and the P-type well 212 may constitute a photodiode PD.

When a second light L2 is incident on the second N-type region 215, a photoelectron is generated. When the first transfer gate TG1 is turned on by a first gate voltage VG1, the photoelectrons may flow to the first detection node FD1 through the first transfer gate TG1. When the second transfer gate TG2 is turned on by a second gate voltage VG2, the photoelectrons may flow to the second detection node FD2 through the second transfer gate TG2. An intensity of the second light L2 incident on the second N-type region 215 may be measured by measuring a voltage variation at the first and second detection nodes FD1 and FD2.

Figure 4:
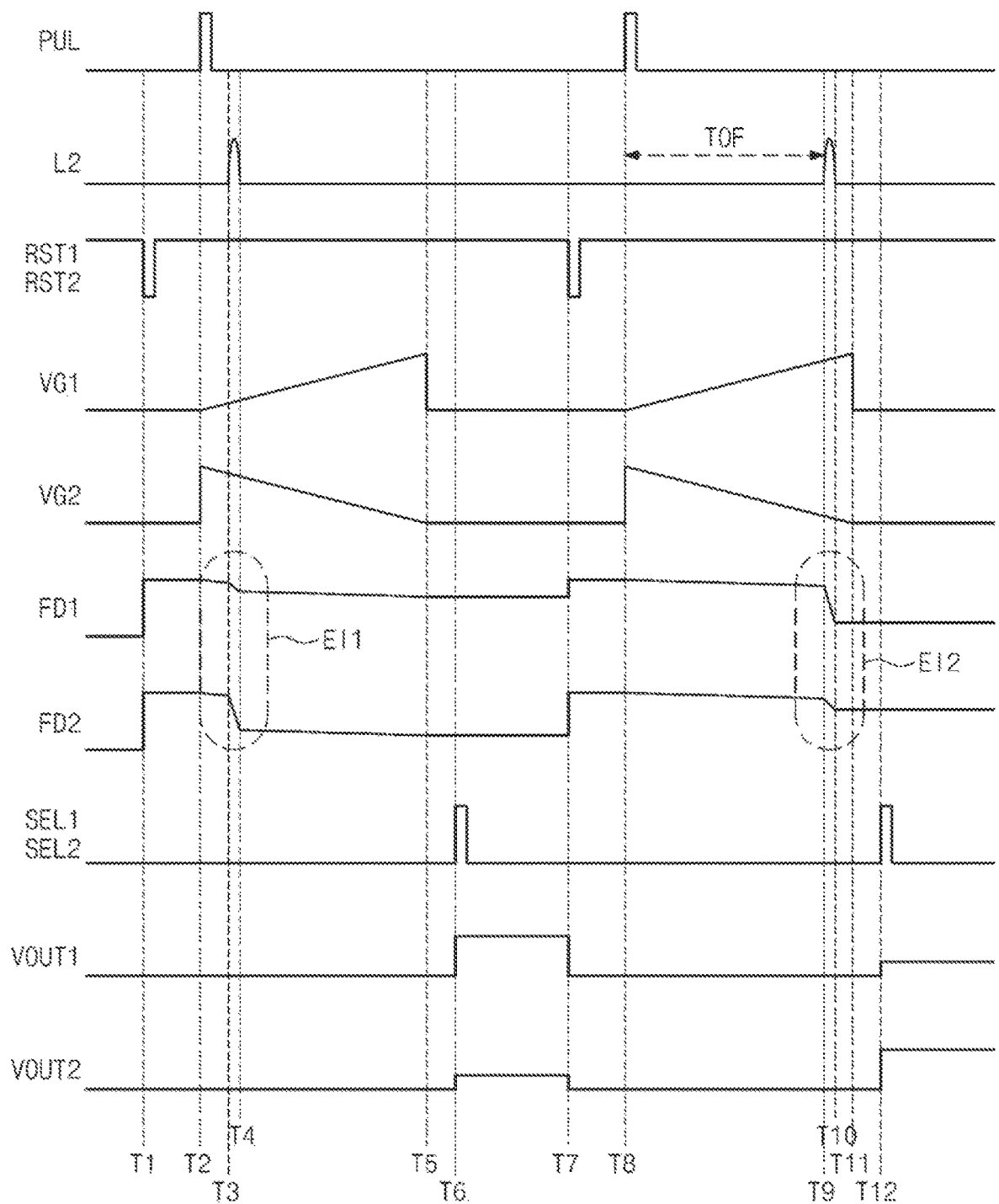
FIG. 4 illustrates examples of voltages supplied to the image sensor in FIGS. 2 and 3 and voltages generated by the image sensor.

FIG. 4 illustrates examples of voltages supplied to the image sensor 130 in FIGS. 2 and 3 and voltages generated by the image sensor. Referring to FIGS. 1 to 3, when the distance measuring apparatus 100 performs distance measurement, the image sensor driver 140 may initially activate reset signals RST1 and RST2 (for example, logic low) at a first time T1 and may subsequently deactivate the reset signals RST1 and RST2 (for example, logic high). While the reset signals RST1 and RST2 are in the active state, the first and second P-type transistors PT1 and PT2 are turned on. When the first and second P-type transistors PT1 and PT2 are turned on, voltages of the first and second detection nodes FD1 and FD2 are charged to a power supply voltage VDD. Since the first and second capacitors C1 and C2 are connected to the first and second detection nodes FD1 and FD2, respectively, the voltages of the first and second detection nodes FD1 and FD2 may be maintained at the power supply voltage VDD even when the first and second P-type transistors PT1 and PT2 are turned off. As an example, while the reset signals RST1 and RST2 are in the active state, the first and second output voltages VOUT1 and VOUT2 may be reset to an initial value, for example, a ground potential. While the reset signals RST1 and RST2 are in the active state, the second gate voltage VG2 may be in a high and the first gate voltage VG1 may be in a low. Accordingly, photoelectrons generated by a background light incident on the photodiode PD may be transmitted to the second detection nodes FD2 by the second transfer gate TG2. Pulse widths of the reset signals RST1 and RST2 may be maintained time interval between a first time T1 and a second time T2.

After the image sensor 130 is reset, for example, after the first and second capacitors C1 and C2 are charged to the power supply voltage VDD, the light source driver 120 output a pulse signal PUL at the second time T2. The light source 110 may irradiate a first light L1 (for example, a laser) to the target object in a pulse form in response to the pulse signal PUL.

The first gate voltage VG1 and the second gate voltage VG2 may be complementarily or differentially controlled (or driven) at the second time T2 in synchronization with the irradiation of the first light L1 from the light source 110. For example, the image sensor driver 140 may gradually increase the first gate voltage VG1 from a low level to a high level during a predetermined duty period, for example, time interval between the second time T2 and a fifth time T5. Also the image sensor driver 140 may gradually decreases the second gate voltage VG2 from a high level to a low level during a predetermined duty period, for example, time interval between the second time T2 and the fifth time T5.

While the first gate voltage VG1 and the second gate voltage VG2 are complementarily or differentially driven, the intensity of the light incident on the photodiode PD is transmitted to the first and second detection nodes PD1 and PD2. For example, the second light L2 may be incident on the photodiode PD during time interval between a third time T3 and a fourth time T4. When there is no incident light L2, the photodiode PD generates only photoelectrons by an ambient light. When there is incident light L2, the photodiode PD generates the photoelectrons by the ambient light and the second light L2. Accordingly, the number of photoelectrons, generated in the photodiode PD while the second light L2 is incident, is greater than the number of photoelectrons generated in the photodiode PD when the second light L2 is not incident. While the first transfer gate TG1 and the second transfer gate TG2 are complementarily or differentially driven, they may operate as voltage control resistors. While the first transfer gate TG1 and the second transfer gate TG2 are complementarily or differentially driven, they may operate at a sub-threshold.

More specifically, a difference between a high level and a low level may be controlled within a threshold voltage in a voltage range lower than threshold voltages of the first transfer gate TG1 and the second transfer gate TG2. For example, when the threshold voltage of the first transfer gate TG1 and the second transfer gate TG2 is 0.5 volt, the first gate voltage VG1 may be swept from 0.1 volt to 0.4 volt during a time interval between the second time T2 to the fifth time T5.

Voltages at the first and second detection nodes FD1 and FD2 or voltages charged to the first and second capacitors C1 and C2 may be gradually decreased by photoelectrons generated by an ambient light even when there is no incident light L2. While there is incident light L2, the voltages of the first and second detection nodes FD1 and FD2 or the voltages charged to the first and second capacitors C1 and C2 are more decreased by the photoelectrons generated by not only an ambient light but also the second light L2. That is, the voltages of the first and second detection nodes FD1 and FD2 are significantly decreased while there is incident light L2, as illustrated in FIG. 4.

To significantly reduce noise generated due to the ambient light, a band-pass filter may be integrated. A transmission wavelength band of the band-pass filter may cover specific spectral band of the second light L2. Specifically, the second light L2 is an infrared laser, and the band-pass filter may deliver precise transmission of specific infrared spectral bands while blocking out-of-band signals at higher and lower wavelengths. The first gate voltage VG1 is gradually increased during a duty time. Accordingly, as the time at which the second light L2 is incident is closer to the second time T2, that is, a time at which the first light L1 is irradiated, the number of photoelectrons which may be transmitted through the first transfer gate TG1 decreases. As the time at which the second light L2 is incident is closer to the fifth time T5, that is, a time at which driving of the first gate voltage VG1 is terminated, the number of the photoelectron which may be transmitted through the first transfer gate TG1 increases. Similarly, the second gate voltage VG2 gradually decreases during the duty time. Accordingly, as the time at which the second light L2 is incident is closer to the second time T2, that is, the time at which the first light L1 is irradiated, the number of photoelectrons which may be transmitted through the second transfer gate TG2 increases. As the time at which the second light L2 is incident is closer to the fifth time T5, that is, the time at which the driving of the second gate voltage VG2 is terminated, the number of the photoelectrons which may be transmitted through the second transfer gate TG2 decreases.

That is, the first transfer gate TG1 may decrease a voltage at the first detection node FD1 in proportion to the intensity of the light incident on the photodiode PD and in proportion to a time elapsed from the second time T2 that the first light L1 is irradiated or the first transfer gate TG1 is driven by the first gate voltage VG1. The second transfer gate TG2 may decrease a voltage at the second detection node FD2 in proportion to the intensity of the light incident on the photodiode PD and in inverse proportion to a time elapsed from the second time T2 that the first light L1 is irradiated or the second transfer gate TG2 is driven by second gate voltage VG2.

Referring to a first exposure interval EI1 in which the second light L2 is incident, a third time T3 at which the second light L2 is incident is closer to the first time T1 than the fifth time T5 between the second time T2 and the fifth time T5. Accordingly, the number of photoelectrons transmitted through the second transfer gate TG2 is greater than the number of photoelectrons transmitted through the first transfer gate TG1. A voltage at the second detection node FD2 is further decreased a voltage at the first detection node FD1.

At the fifth time T5 at which the duty time is terminated, the image sensor driver 140 may control the first and second gate voltages VG1 and VG2 in such a manner that the first and second gate voltages TG1 and TG2 are turned off. For example, the image sensor driver 140 may supply a ground voltage to the first and second gate voltages VG1 and VG2.

At a sixth time T6, the image sensor driver 140 activates the first and second selection signals SEL1 and SEL2. When the first and second selection signals SEL1 and SEL2 are activated, the voltages at the first and second detection nodes FD1 and FD2 are transmitted by the first and third N-type transistors NT1 and NT3 and are output through the second and fourth N-type transistors NT2 and NT4. For example, the second and fourth N-type transistors NT2 and NT4 may output the first and second output voltages VOUT1 and VOUT2.

At the seventh time T7, the first and second reset signals RST1 and RST2 may be received to measure the next distance. To measure the next distance at the seventh time T7, the second gate voltage VG2 may rise to a high level to remove the photoelectrons accumulated in the photodiode PD by the ambient light.

For an eighth time T8 to a twelfth time T12, the next distance measurement may be performed. Referring to a second exposure interval EI2 in which the second light L2 is incident during the next distance measurement, the time at which the second light L2 is incident is a ninth time T9 and a tenth time T10. The ninth and tenth times T9 and T10 are closer to the eleventh time T11, at which the duty time is terminated, than the eighth time T8 at which the first light L1 is irradiated. Thus, the first detection voltage FD1 is further decreased than the second detection voltage FD2.

As described above, the photodiode PD generates photoelectrons in proportional to the intensity of an incident light, for example, the intensity of the second light L2. That is, the first and second transfer gates TG1 and TG2 decrease the voltages at the first and second detection nodes FD1 and FD2 in proportion to the intensity of the second light L2. The first and second gate voltages VG1 and VG2 are controlled complementarily or differentially. The first gate voltage VG1 increases from a low level to a high level, and the second gate voltage VG2 decreases from a high level to a low level. Accordingly, the first transfer gate TG1 decreases the voltage at the first detection node FD1 in proportion to a time elapsed from the time at which the first light L1 is irradiated, and the second transfer gate TG2 decreases the voltage at the second detection node FD2 in inverse proportion to the time elapsed from the time at which the first detection node L1 is irradiated.

The first output voltage VOUT1 and the second output voltage VOUT2 complementarily or differentially involve not only information on a luminance of the second light L2 but also information on whether a time, at which the second light L2 is incident, is close to a starting point or an ending point of duty of time. A time between the time, at which the first light L1 is irradiated, and the time, at which the second light L2 is incident, may be a time of flight (TOF). That is, the first output voltage VOUT1 and the second output voltage VOUT2 further include information on what percentage of the duty time in the flight time (TOF). Accordingly, when a distance is complementarily or differentially calculated using the first output voltage VOUT1 and the second output voltage VOUT2, reliability of the calculated distance is improved.

For example, the distance measuring apparatus 100 calculates a distance using at least one of a ratio of the first output voltage VOUT1 to the sum of the first output voltage VOUT1 and the second output voltage VOUT2 and a ratio of the second output voltage VOUT2 to the sum of the first output voltage VOUT1 and the second output voltage VOUT2.

Figure 5:
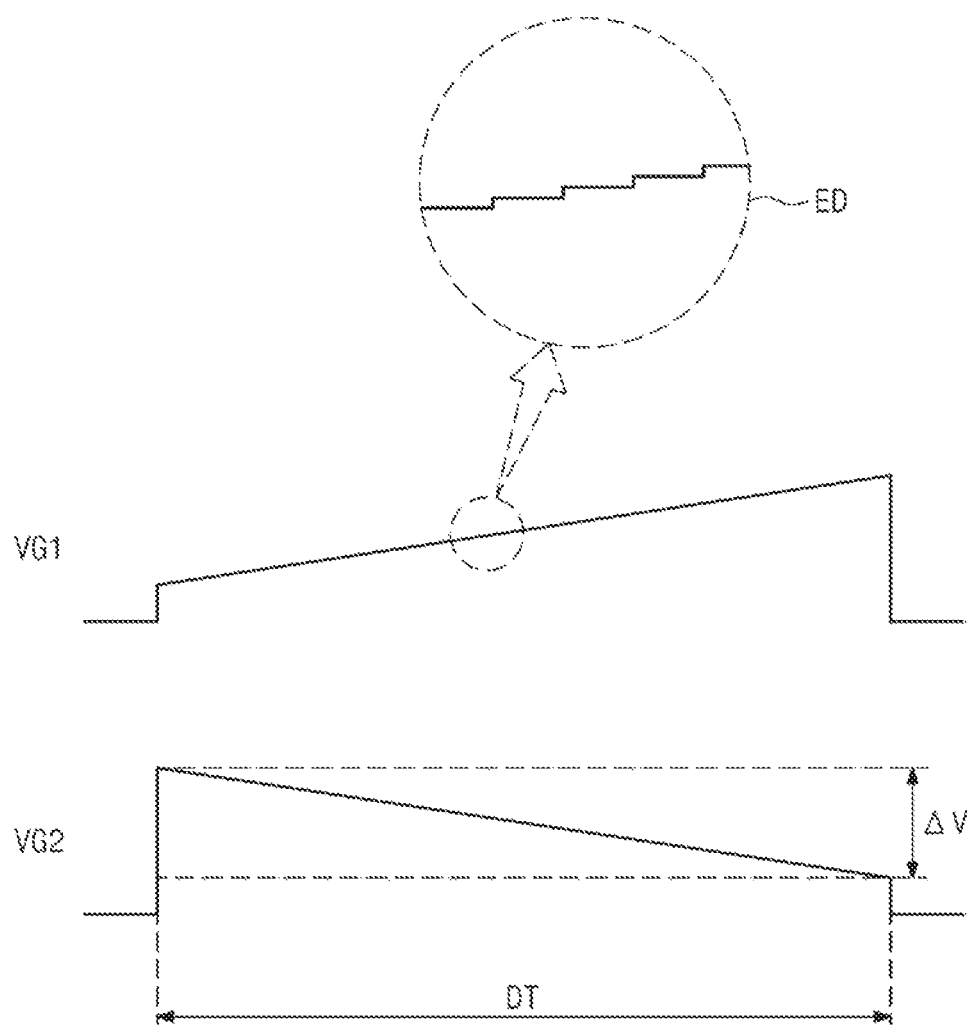
FIG. 5 illustrates examples of first and second gate voltages corresponding to a single duty time.

FIG. 5 illustrates examples of the first and second gate voltages VG1 and VG2 corresponding to a single duty time DT. Referring to FIG. 5, the first gate voltage VG1 may gradually increase from a first positive voltage to a second positive voltage during the duty time DT. For example, the first gate voltage VG1 may increases stepwise, as shown by an enlarged drawing ED. A first positive voltage of the first gate voltage VG1 may have a voltage level in which the first transmission gate TG1 is turned on.

The second gate voltage VG2 may gradually decrease from a second positive voltage to a first positive voltage during the duty time DT. For example, the second gate voltage VG2 may decrease stepwise. The first positive voltage of the second gate voltage VG2 may have a voltage level in which the second transfer gate TG2 is turned on.

As an example, a difference ΔV between a starting level and an ending level of the first gate voltage VG1 or the second gate voltage VG2 may controlled to be lower than 100 mV.

As an example, the duty time DT may be set in proportion to a maximum measuring distance of the distance measuring apparatus 100 (see FIG. 1). As the duty time DT increases, the maximum measurement distance increases. Meanwhile, as the duty time DT decreases, the maximum measurement distance may decrease. For example, the duty time DT is controlled to be 10 microseconds (μs) or less, and the maximum measuring distance of the distance measuring apparatus 100 may reach at approximately 1.5 km.

Figure 6:
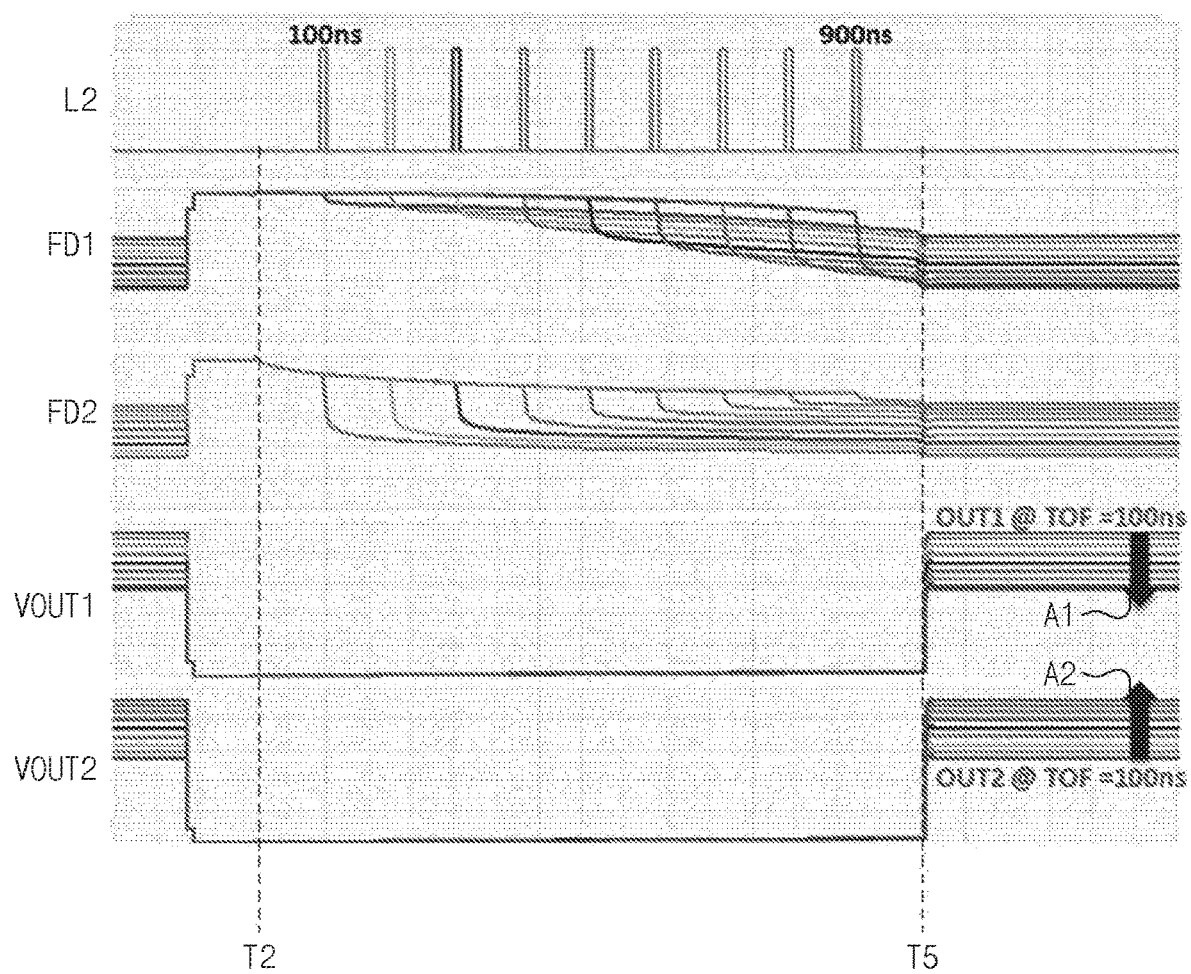
FIG. 6 illustrates a result of a simulation in which voltages of first and second detection nodes and first and second output voltages are measured by adjusting incident times of a second light when a duty time is 1 microsecond, and illustrates that outputs formed by lights incident at different times change in opposite directions in which the outputs increase or decrease at first and second output voltages.

FIG. 6 illustrates a result of a simulation in which voltages of first and second detection nodes and first and second output voltages are measured by adjusting incident times of a second light when a duty time is 1 microsecond. Referring to FIGS. 2 and 6, as the time at which the second light L2 is incident is closer to the second time T2, the voltage at the first detection node FD1 is less decreased while the voltage at the second detection node FD2 is further decreased. That is, as the time at which the second light L2 is incident is closer to the second time T2, the first output voltage VOUT1 becomes high level while the second output voltage VOUT2 becomes low level.

Similarly, as the time at which the second light L2 is incident is closer to the fifth time T5, the voltage at the first detection node FD1 is further decreased while the voltage at the second detection node FD2 is less decreased. That is, as the time at which the second light L2 is incident is closer to the second time T2, the first output voltage VOUT1 becomes lower while the second output voltage VOUT2 becomes higher.

Figure 7:
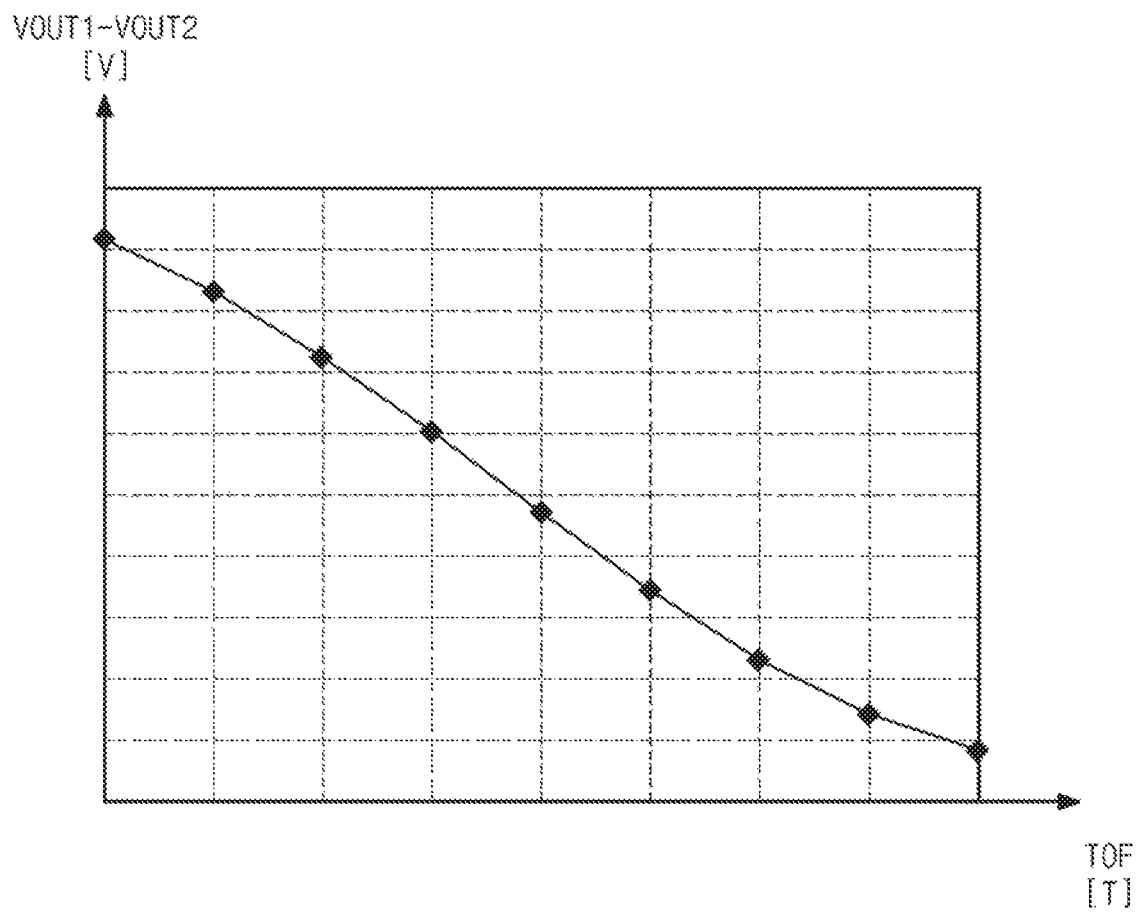
FIG. 7 illustrates an example in which a difference between a first output voltage and a second output voltage varies depending on a time of flight.

FIG. 7 illustrates an example in which a difference between the first output voltage VOUT1 and the second output voltage VOUT varies depending on a time of flight (TOF). In FIG. 7, a horizontal axis denotes a time of flight (TOF), and a unit thereof is time T. A vertical axis denotes a value obtained by subtracting the second output voltage VOUT2 from the first output voltage VOUT1, and a unit thereof is a voltage V.

Referring to FIGS. 4 and 7, as the time of flight (TOF) decreases, the first output voltage VOUT1 increases while the second output voltage VOUT2 decreases. Accordingly, as the time of flight (TOF) decreases, the value obtained by subtracting the second output voltage VOUT2 from the first output voltage VOUT1 increases. As the time of flight (TOF) increases, the first output voltage VOUT1 decreases while the second output voltage VOUT2 increases. Accordingly, as the time of flight (TOF) increases, the value obtained by subtracting the second output voltage VOUT2 from the first output voltage VOUT1 decreases. That is, the value obtained by subtracting the second output voltage VOUT2 from the first output voltage VOUT1 is in inverse proportion to the time of flight (TOF), and the time of flight (TOF) may be calculated according to the value obtained by subtracting the second output voltage VOUT2 from the first output voltage VOUT1.

Figure 8:
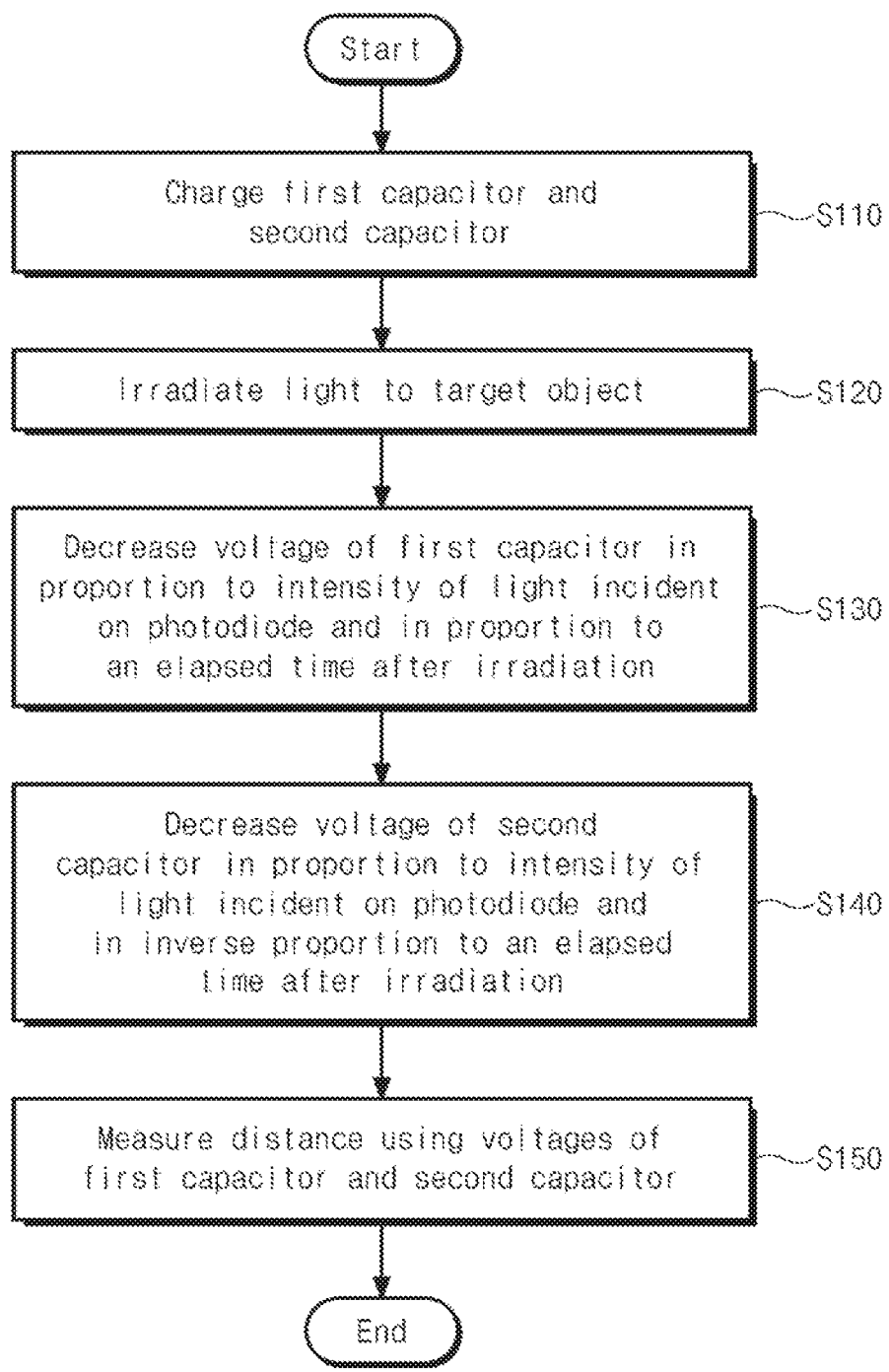
FIG. 8 is a flowchart illustrating an example in which a distance measuring apparatus according to an example embodiment of the present disclosure measures a distance.

FIG. 8 is a flowchart illustrating an example in which a distance measuring apparatus according to an example embodiment of the present disclosure measures a distance. Referring to FIGS. 1, 2 and 8, in operation S110, the image sensor driver 140 may activate the first and second reset signals RST1 and RST2. As the first and second reset signals RST1 and RST2 are activated, the first and second capacitors C1 and C2 connected to the photodiode PD through the first and second transfer gates TG1 and TG2 may be charged to the power supply voltage VDD.

In operation S120, the light source driver 120 may output the pulse signal PUL in such a manner that the light source 110 irradiates the first light L1. The image sensor driver 140 may drive the first and second gate voltages VG1 and VG2 in synchronization with output of the pulse signal PUL.

In operation S130, the image sensor driver 140 may control the first transfer gate TG1 through the first gate voltage VG1 in such a manner that a voltage of the first capacitor C1 decreases in proportion to the intensity of a light incident on the photodiode PD and in proportion to a time elapsed after the first light L1 is irradiated.

In operation S140, the image sensor driver 140 may control the second transfer gate TG2 through the second gate voltage VG2 in such a manner that a voltage of the second capacitor C2 decreases in proportion to the intensity of a light incident on the photodiode PD and in inverse proportion to a time elapsed after the first light L1 is irradiated.

In operation S150, the controller 150 may measure a distance using the voltages of the first capacitor C1 and the second capacitor C2. For example, the image sensor driver 140 may control the image sensor 130 in such a manner that the voltage of the first capacitor C1 and the voltage of the second capacitor C2 are amplified to be output to the first output voltage VOUT1 and the second output voltage VOUT2. The controller 150 or the image sensor driver 140 may measure (or calculate) a distance using the first output voltage VOUT1 and the second output voltage VOUT2.

According to example embodiments of the present disclosure, lights incident on a photodiode are measured as voltages through transfer gates which are differentially or complementarily controlled. Since a distance value is complementarily or differentially measured, a distance measuring apparatus having improved reliability and a method of operating the same are provided.

Although the present disclosure and its advantages have been described in detail, it should be understood that various changes, substitutions and alterations can be made herein without departing from the spirit and scope of the disclosure as defined by the following claims.

What is claimed is:
1. A distance measuring apparatus comprising:
an image sensor including a photodiode, a first capacitor and a second capacitor, and a first transfer gate and a second transfer gate configured to deliver an output of the photodiode to the respective first and second capacitors; and
an image sensor driver configured to complementarily drive the first transfer gate and the second transfer gate, provide a first gate voltage sweeping from a low level to a high level to the first transfer gate, and provide a second gate voltage sweeping from the high level to the low level to the second transfer gate; and a light source that outputs a pulse light, wherein:
the image sensor driver drives the first gate voltage and the second gate voltage in synchronization with the pulse light during a predetermined duty time,
the pulse light has a width that is smaller than the predetermined duty time, and
a time of flight (TOF) between a time at which the light pulse is irradiated and a time at which a reflected light pulse is incident is larger than the width of the pulse light.

2. The distance measuring apparatus as set forth in claim 1, wherein the first transfer gate and the second transfer gate operate as a voltage controlled resistor.

3. The distance measuring apparatus as set forth in claim 1, wherein the image sensor driver controls the first gate voltage and the second gate voltage in a voltage range lower than threshold voltages of the first transfer gate and the second transfer gate.

4. The distance measuring apparatus as set forth in claim 1, wherein the image sensor driver controls a time period in which the first gate voltage increases, and a time period in which the second gate voltage decreases, in connection with a total distance range to be measured.

5. The distance measuring apparatus as set forth in claim 1, wherein the image sensor further includes a first reset transistor configured to charge a power supply voltage to the first capacitor and a second reset transistor configured to charge the power supply voltage to the second capacitor before the first gate voltage and the second gate voltage are driven.

6. The distance measuring apparatus as set forth in claim 1, wherein the first transfer gate decreases a voltage of the first capacitor in proportion to the intensity of a light incident on the photodiode and in proportion to a time elapsed after the first gate voltage is driven.

7. The distance measuring apparatus as set forth in claim 1, wherein the second transfer gate decreases a voltage of the second capacitor in proportion to the intensity of a light incident on the photodiode and in inverse proportion to a time elapsed after the second gate voltage is driven.

8. The distance measuring apparatus as set forth in claim 1, wherein the image sensor further includes:
a first transistor configured to deliver a voltage of the first capacitor; and
a second transistor configured to deliver a voltage of the second capacitor.

9. The distance measuring apparatus as set forth in claim 8, wherein the image sensor includes:
a first selection transistor configured to deliver an output of the first transistor to the image sensor driver in response to a first selection signal; and
a second selection transistor configured to deliver an output of the second transistor to the image sensor driver in response to a second selection signal.

10. The distance measuring apparatus as set forth in claim 9, wherein the image sensor driver activates the first selection signal and the second selection signal after the first gate voltage is driven to the high level and the second gate voltage is driven to the low level.

11. The distance measuring apparatus as set forth in claim 1, further comprising:
a controller configured to calculate a distance from an object corresponding to the light incident on the photodiode using a first voltage obtained using the first capacitor and a second voltage obtained using the second capacitor.

12. The distance measuring apparatus as set forth in claim 11, wherein the controller calculate the distance using at least one of a ratio of the first voltage to the sum of the first and second voltages and a ratio of the second voltage to the sum of the first and second voltages.

13. A method of operating a distance measuring apparatus, comprising:
charging first and second capacitors connected to a photodiode through first and second transfer gates, respectively;
irradiating a pulse light from a light source to a target object, wherein the pulse light has a width smaller than a predetermined duty time;
using an image sensor driver, driving a first gate voltage and a second gate voltage in synchronization with irradiating the light during the predetermined duty time, wherein the first gate voltage sweeps from a low level to a high level, and the second gate voltage sweeps from the high level to the low level;
decreasing a voltage of the first capacitor in proportion to (i) an intensity of light reflected from the target object and incident on the photodiode and (ii) a time elapsed after the light is irradiated;
decreasing a voltage of the second capacitor in proportion to the intensity of the light incident on the photodiode and in inverse proportion to the time elapsed after the light is irradiated; and
measuring a distance between the target object and the distance measuring apparatus using the voltage of the first capacitor and the voltage of the second capacitor,
wherein a time of flight (TOF) between a time at which the light pulse is irradiated and a time at which the light reflected from the target object is incident on the photodiode is larger than the width of the pulse light.

14. The method as set forth in claim 13, wherein decreasing the voltage of the first capacitor includes gradually increasing a gate voltage of the first transfer gate from a first level to a second level during the predetermined duty period.

15. The method as set forth in claim 13, wherein the decreasing the voltage of the second capacitor includes gradually decreasing a gate voltage of the second transfer gate from a second level to a first level during the predetermined duty period.

16. The method as set forth in claim 15, wherein the predetermined duty period is determined in proportion to a maximum measuring distance of the distance measuring apparatus.

17. The method as set forth in claim 15, wherein measuring the distance between the target object and the distance measuring apparatus is performed after the predetermined duty period.

18. The method as set forth in claim 13, wherein decreasing the voltage of the first capacitor and decreasing the voltage of the second capacitor are started in synchronization with irradiating the light.

* * * * *